(12) United States Patent
Tran et al.

(10) Patent No.: US 6,829,671 B1
(45) Date of Patent: Dec. 7, 2004

(54) METHOD AND SYSTEM FOR IMPROVED AUDIO DATA RETRIEVAL FROM AN OPTICAL MEDIA

(75) Inventors: (Paul) Phuc Thanh Tran, Milpitas, CA (US); Thien-Phuc Nguyen Do, San Jose, CA (US); Tom Vu, San Jose, CA (US)

(73) Assignee: ProMOS Technologies Inc., Hsing-Chu (TW)

( * ) Notice: Subject to any disclaimer, the term of this patent is extended or adjusted under 35 U.S.C. 154(b) by 0 days.

(21) Appl. No.: 09/542,175

(22) Filed: Apr. 4, 2000

(51) Int. Cl.⁷ .............................................. G06F 12/00
(52) U.S. Cl. ........................... 711/4; 714/769; 714/700; 714/746; 714/814; 714/815; 714/55; 386/95; 386/96; 386/13; 713/201; 711/159
(58) Field of Search .................. 714/55, 700, 746, 714/814, 815, 769; 713/201; 386/95, 96, 13; 711/4, 159

(56) References Cited

U.S. PATENT DOCUMENTS

| | | | | | |
|---|---|---|---|---|---|
| 5,596,558 A | * | 1/1997 | Arataki et al. | ........... | 369/53.18 |
| 5,850,382 A | * | 12/1998 | Koishi et al. | ............. | 369/275.3 |
| 6,075,920 A | * | 6/2000 | Kawamura et al. | ........... | 386/95 |
| 6,078,559 A | * | 6/2000 | Takemura et al. | ....... | 369/275.3 |
| 6,092,232 A | * | 7/2000 | Nagai et al. | ................. | 714/769 |
| 6,345,374 B1 | * | 2/2002 | Tsuda | ......................... | 714/746 |

* cited by examiner

*Primary Examiner*—Gregory Morse
*Assistant Examiner*—Tongoc Tran
(74) *Attorney, Agent, or Firm*—Sawyer Law Group LLP

(57) ABSTRACT

The present invention provides a method and system for audio data retrieval from an optical media. The method includes reading a sector of audio data from the optical media, the sector comprising a sector data and a sector sub-code; collecting the sector sub-code; correcting any errors in the sector data in a fixed time period; calculating a time offset between a time for the collecting of the sector sub-code and the fixed time period; and matching the corrected sector data to the sector sub-code based on the calculated time offset. A method and system for retrieving audio data from an optical media has been disclosed. The present invention uses a fixed time period for the sector data error correction process. By using a fixed correction time, the sector data and the sector sub-code can be automatically matched based upon an offset calculated from the fixed correction time. In this manner, the sector data and its corresponding sector sub-code may be accurately matched without the need for complicated algorithms. This saves significant processing resources. The location from which the reading of the audio data is resumed is more accurately determined.

15 Claims, 4 Drawing Sheets

METHOD AND SYSTEM FOR IMPROVED AUDIO DATA RETRIEVAL FROM AN OPTICAL MEDIA

FIELD OF THE INVENTION

The present invention relates to audio data from an optical media, and more particularly to the retrieval of audio data from the optical media.

BACKGROUND OF THE INVENTION

FIG. 1 illustrates a conventional method of retrieving audio data from an optical media, such as a Compact Disc (CD). The audio data comprises sectors of data, each sector having a header which identifies it, i.e., identifies where the sector begins. The identifying information in the header is obtained from the "sub-Q" bytes of the sector. Before the audio data may be played, it must first be decoded. Part of the decoding process is the location and correction of any errors in the audio data after demodulation. This process is typically referred to as the Error Correction Code (ECC) process. For audio data, the ECC process occurs in two stages: C1 correction 102, and C2 correction 104. C1 and C2 refer to two standard encoding processes for encoding additional information into the data for use in correction of errors which may exist after demodulation. In the C2 encoding process, additional bytes are encoded into the C1 encoded data, and the frames of the C2 encoded data are interleaved with an appropriate time delay. This decreases the probability of having an uncorrectable error. In the C1 encoding process, additional bytes are encoded containing information about the data, such that for a data to be uncorrectable, both the data itself and the C1 encoded bytes must fail. The C1 encoding process further decreases the probability of an uncorrectable error. The C1 and C2 encoding processes are standards in the art and will not be described in further detail here. In the ECC process, the interleaved state of the data from the C2 encoding process is reversed. Errors in the decoding are then corrected by the ECC using the information encoded by the C1 and C2 encoding processes.

The data of each sector need to be corrected, but not the sub-code. Thus, at node A, the sector data are forwarded to the C1 and C2 correction 102, 104 and then to node B, while the sector sub-code is forwarded directly to node B. The sector sub-code circumvents the ECC process. Thus, the sector data arrives at node B after its sector sub-code. In addition, the amount of time required for completion of the ECC process varies, depending on the presence of errors, the number of errors, the speed of the disc, and other factors. Thus, the amount of time required for a sector data to travel from node A to node B varies.

Conventionally, a group of audio data sectors is read from the CD until a buffer 110 is filled. Then the reading of the CD is suspended. The buffered data sectors are then forwarded to the Digital to Analog Converter 106 (DAC) and audio device 108. Once the data in the buffer 110 is played, the reading of the audio data resumes where it left off. In order to do so, the location of the last read sector must be found, i.e., its identity must be known. Otherwise, the location from which to resume reading cannot be determined. However, the sector data reaches node B without its corresponding sector sub-code. Thus, in order to know where the reading of the data has been suspended, the last read sector must be matched to its sector sub-code. Once matched, this sector may be located on the CD, and the reading of the data may be resumed from this location.

However, since the time period required for the ECC process varies, the matching is difficult. To match the sector data with its corresponding sector sub-code, the conventional method transfers the sector data in the buffer 110 into another location, such as another buffer (not shown). The same audio data sectors are then reread from the CD. The buffered sector data and the reread audio data sectors are then compared to find the identify of the last read sector. However, the algorithm required to perform such a comparison is complicated and require significant processing resources. The accuracy of the matching is also limited since the time required by the ECC process varies and thus is not always predictable.

Accordingly, there exists a need for an improved method and system for audio data retrieval from an optical media. The method and system should simplify the matching of the sector data and its sector sub-code, reduce processing resource requirements, and increase the accuracy of the matching. The present invention addresses such a need.

SUMMARY OF THE INVENTION

The present invention provides a method and system for audio data retrieval from an optical media. The method includes reading a sector of audio data from the optical media, the sector comprising a sector data and a sector sub-code; collecting the sector sub-code; correcting any errors in the sector data in a fixed time period; calculating a time offset between a time for the collecting of the sector sub-code and the fixed time period; and matching the corrected sector data to the sector sub-code based on the calculated time offset. A method and system for retrieving audio data from an optical media has been disclosed. The present invention uses a fixed time period for the sector data error correction process. By using a fixed correction time, the sector data and the sector sub-code can be automatically matched based upon an offset calculated from the fixed correction time. In this manner, the sector data and its corresponding sector sub-code may be accurately matched without the need for complicated algorithms. This saves significant processing resources. The location from which the reading of the audio data is resumed is more accurately determined.

DETAILED DESCRIPTION

The present invention provides an improved method and system for audio data retrieval from an optical media. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments.

Thus, the present invention is not intended to be limited to the embodiment shown but is to be accorded the widest scope consistent with the principles and features described herein.

The method and system in accordance with the present invention uses a fixed time period for the sector data error correction process. By using a fixed correction time, the sector data and the sector sub-code can be automatically matched based upon an offset calculated from the fixed correction time. In this manner, the sector data and its corresponding sector sub-code may be matched without the need for complicated algorithms. This saves significant processing resources. The location from which the reading of the data is resumed is more accurately determined.

To more particularly describe the features of the present invention, please refer to FIGS. 2 through 4 in conjunction with the discussion below.

Figure 1:
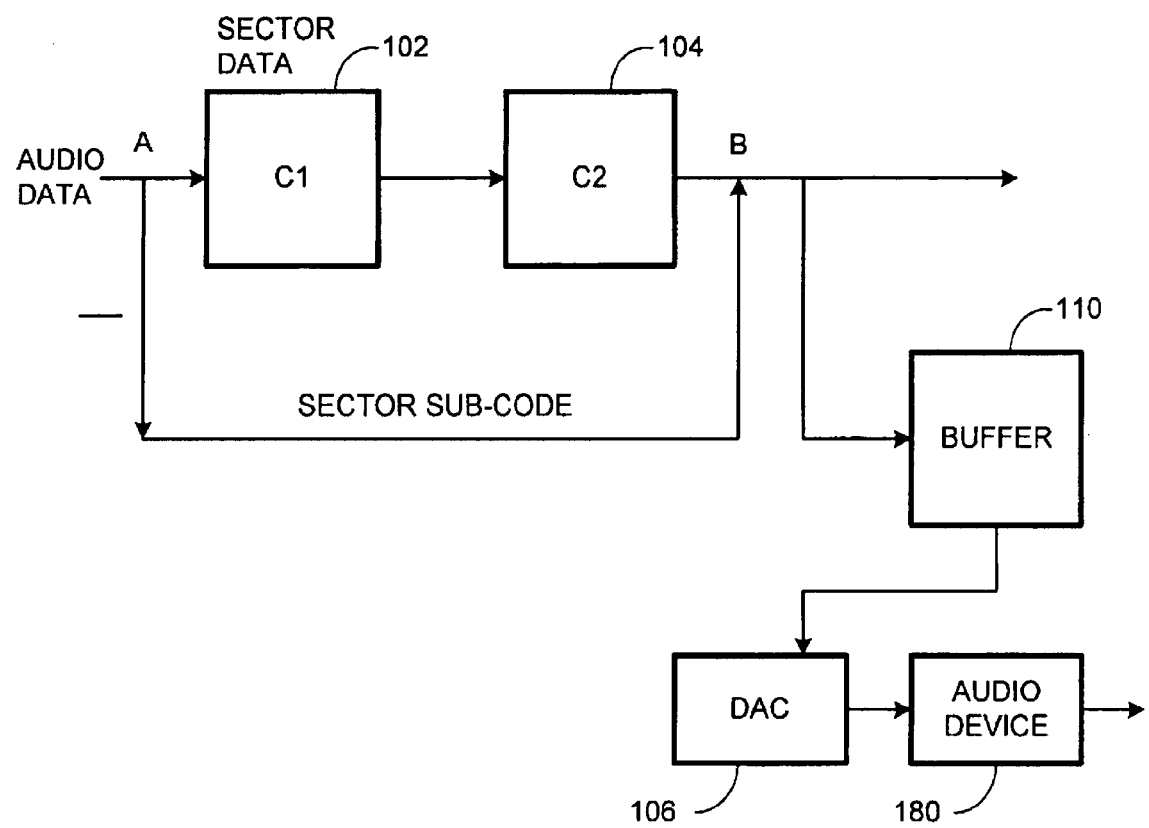
FIG. 1 illustrates a conventional method of retrieving audio data from an optical media.
Figure 2:
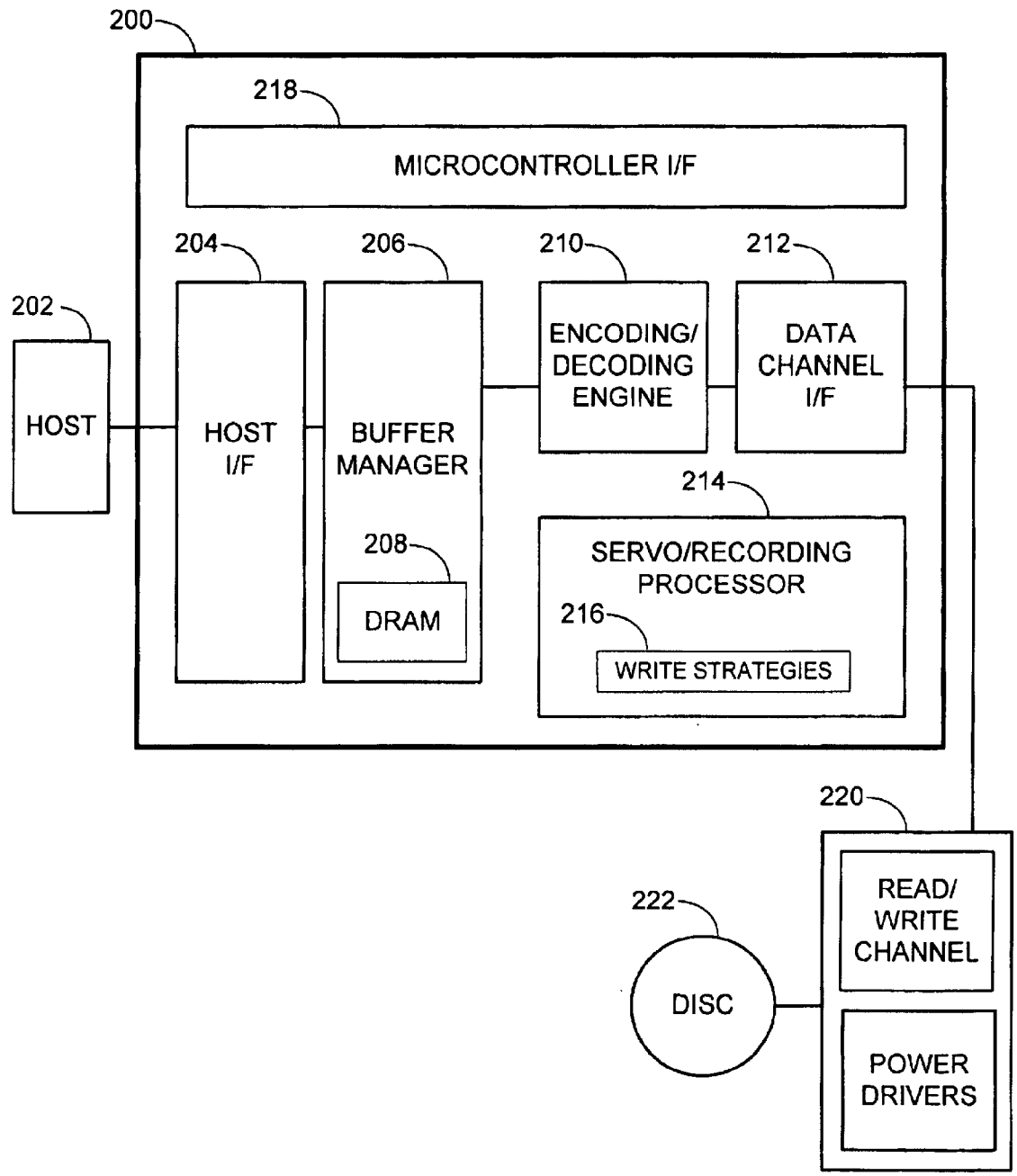
FIG. 2 is a block diagram illustrating a preferred embodiment of a controller which may use the method and system in accordance with the present invention.

FIG. 2 is a block diagram illustrating a preferred embodiment of a controller which may use the method and system in accordance with the present invention. The elements 204–218 represent the logical architecture of the controller 200. The controller 200 comprises a host interface 204, a buffer manager 206 with an embedded memory 208, an integrated encoding/decoding engine 210, a data channel interface 212, an integrated servo/recording processor 214 embedded with the write strategies 216, and a microcontroller interface 218. In the preferred embodiment, the embedded memory 208 is an embedded dynamic random access memory (DRAM). The integrated servo/recording processor 214 provides the mechanical control of the disc 220 and the spindle and sledge (not shown) of the drive for both reading and writing of data. The servo/recording processor 214 interfaces with the disc 222 in the writing of data. Integrated into the processor 214 are the write strategies 216 which controls the writing of the data so that they data is in a standard format. The write control logic in accordance with the present invention would be part of the servo/recording processor 214 for controller 200. The controller 200 is further described in co-pending U.S. Patent Application entitled "Integrated Controller To Process Both Optical Reads And Optical Writes Of Multiple Optical Media", Ser. No. 09/652,254, filed on Aug. 30, 2000. Applicant hereby incorporates this patent application by reference.

Figure 3:
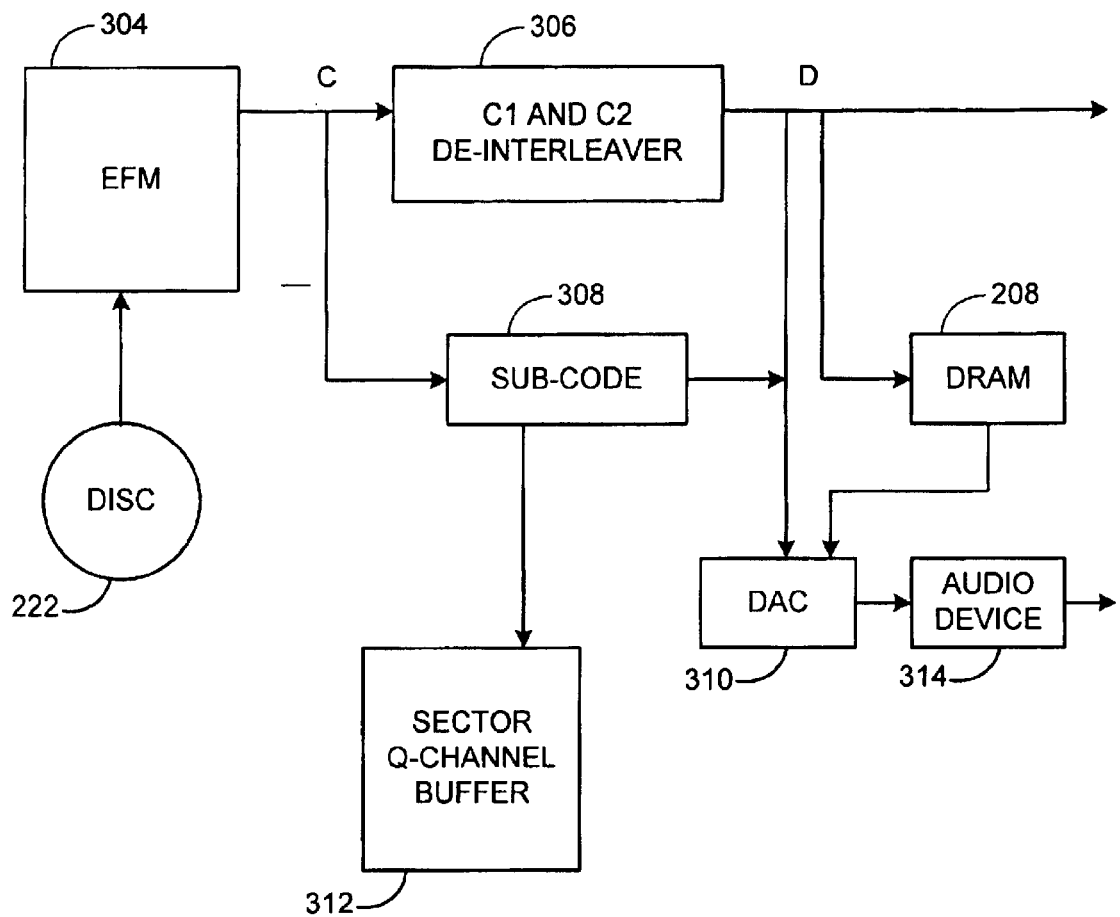
FIG. 3 is a logical diagram of a preferred embodiment of a method of retrieving audio data from an optical media in accordance with the present invention.

FIG. 3 is a logical diagram of a preferred embodiment of a method of retrieving audio data from an optical media in accordance with the present invention. The preferred embodiment of the method is implemented as part of the integrated encoding/decoding engine 210. Audio data is read from the optical disc 222 and demodulated by an Eight-to-Fourteen Modulation (EFM) demodulator 304. The sector data of the demodulated audio data are corrected by the ECC process, performed by the C1 and C2 de-interleaver 306. The sub-code block 308 extracts the sector sub-code and stores them in the sector Q-channel buffer 316. The embedded DRAM 208 serves as a buffer for the corrected sector data, which is eventually played by the DAC 310 and the audio device 314.

In the preferred embodiment, the correction time required for the ECC process, i.e., for sector data to travel from node C to node D, is fixed, even if the sector data has no errors. From this fixed correction time, a time offset between the arrival of the sector data and the arrival of the sector sub-code at node D can be calculated. This time offset is used to accurately and automatically match the sector data to the sector sub-code. For example, assume the time offset is T, and the time at which the sector sub-code arrives at node D is $t_1$. Then, the sector data which arrives at node D at time $t_1+T$ is the sector data which matches the sector sub-code. Thus, when the reading of audio data from the disc 222 is suspended, the identity of the last read sector can be accurately determined based upon the matched sector sub-code. The sector can be found on the disc 222, and the reading of the audio data resumed from that location.

Figure 4:
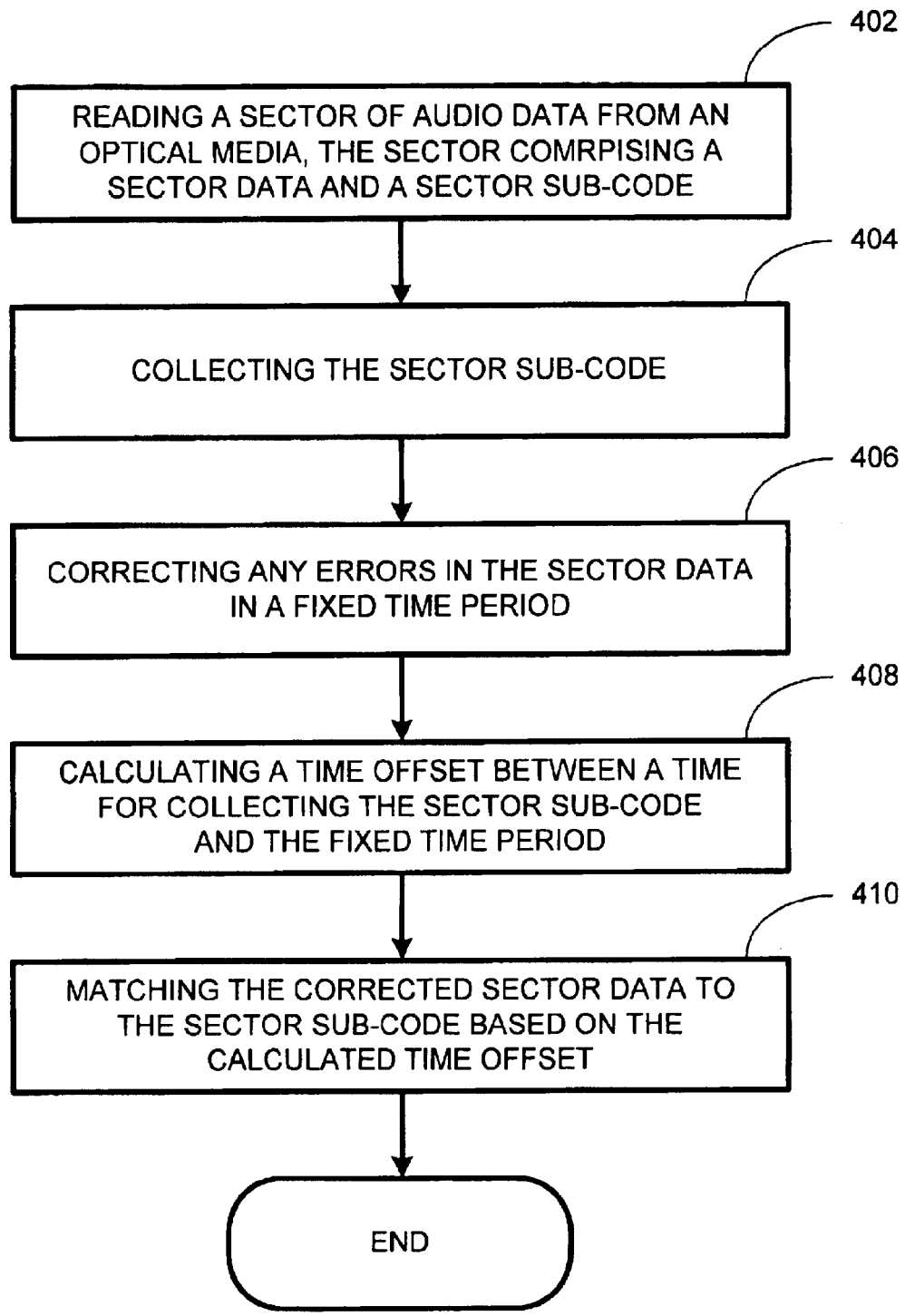
FIG. 4 is a flowchart illustrating the preferred embodiment of the method of retrieving audio data from an optical media in accordance with the present invention.

FIG. 4 is a flowchart illustrating the preferred embodiment of the method of retrieving audio data from an optical media in accordance with the present invention. First, a sector of audio data is read from an optical media 222, via step 402. The sector comprises a sector data and a sector sub-code. After this sector is demodulated, the sector data and the sector sub-code take different paths. The sector sub-code is collected, via step 404, by the sub-code block 308 and stored in the sector Q-channel buffer 316. Any errors in the sector data is corrected by the C1 and C2 de-interleaver 306, via step 406, in a fixed period of time. Then, the time offset between a time for collecting of the sector sub-code and the fixed correction time period is calculated, via step 408. In other words, the time offset between the arrival of the sector data and the arrival of the sector sub-code at node D is calculated.

In the preferred embodiment, the correction time is reflected by the formula:

Correction Time=$C1$-Corr+Jittering-buffer+$C2$-Corr+$C2$-Deinterleave

C1-Corr is the time required to perform C1 error correction. The jittering-buffer is the time delay caused by jittering. Jittering refers to the erroneous dropping of bits from a data frame or the insertion of bits into the data frame due to noise in the data stream. C2-Corr is the time required to perform C2 error correction. C2-Deinterleave is the time required to de-interleave the sector data. In the preferred embodiment, a jittering buffer large enough to compensate for the jittering is used such that it does not affect the correction time. C2-Deinterleave is fixed, as it is also in the prior art. A key feature of the present invention is the fixing of C1-Corr and C2-Corr. By fixing them, the total correction time is fixed, even if the sector data has no errors.

Once the time offset is calculated, it is used to match the corrected sector data to its corresponding sector sub-code, via step 410. Once the sector sub-code and the sector data are matched, the identity of the last read sector is known. Thus, when the reading of audio data is resumed, the correct location from which to resume reading can be found.

Although the present invention is described in the context of the controller 200, one of ordinary skill in the art will understand that controllers with other architectures, which is able to support a fixed time for the ECC process, may be used without departing from the spirit and scope of the present invention.

A method and system for retrieving audio data from an optical media has been disclosed. The present invention uses a fixed time period for the sector data error correction process. By using a fixed correction time, the sector data and the sector sub-code can be automatically matched based upon an offset calculated from the fixed correction time. In this manner, the sector data and its corresponding sector sub-code may be accurately matched without the need for complicated algorithms. This saves significant processing resources. The location from which the reading of the audio data is resumed is more accurately determined.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for audio data retrieval from an optical media, comprising the steps of:
    (a) reading a sector of an audio data from the optical media, the sector comprising a sector data and a sector sub-code;
    (b) collecting the sector sub-code;
    (c) correcting any errors in the sector data in a fixed time period;
    (d) calculating a time offset between a time for the collecting of the sector sub-code and the fixed time period; and
    (e) matching the corrected sector data to the sector sub-code based on the calculated time offset.

2. The method of claim 1, wherein the collecting step (b) further comprises:
    (b1) storing the sector sub-code in a sector Q-channel buffer.

3. The method of claim 1, wherein the correcting step (c) comprises:
    (c1) performing a C1 correction for the sector data, wherein a C1 correction time is fixed; and
    (c2) performing a C2 correction for the C1 corrected sector data, wherein a C2 correction time is fixed.

4. The method of claim 3, further comprising:
    (c3) storing the corrected sector data in a buffer; and
    (c4) suspending a reading of audio data if the buffer is full.

5. The method of claim 1, wherein the calculating step (d) comprises:
    (d1) calculating a time offset, wherein the time offset equals a time difference between an arrival of the sector sub-code at a node and an arrival of the corrected sector data at the node.

6. The method of claim 1, further comprising:
    (f) determining an identity of the sector based on the matched sector sub-code;
    (g) locating the identified sector on the optical media; and
    (h) resuming a reading of audio data from the located sector.

7. A method for audio data retrieval from an optical media, comprising the steps of:
    (a) reading a sector of audio data sector from the optical media, the sector comprising a sector data and a sector sub-code;
    (b) collecting the sector sub-code;
    (c) correcting any errors in the sector data in a fixed time period;
    (d) storing the corrected sector data in a buffer;
    (e) suspending a reading of audio data if the buffer is full;
    (f) calculating a time offset between a time for the collecting of the sector sub-code and the fixed time period;
    (g) matching the corrected sector data to the sector sub-code based on the calculated time offset;
    (h) determining an identity of the sector based on the matched sector sub-code;
    (i) locating the identified sector on the optical media; and
    (j) resuming the reading of audio data from the located sector.

8. The method of claim 7, wherein the collecting step (b) further comprises:
    (b1) storing the sector sub-code in a sector Q-channel buffer.

9. The method of claim 1, wherein the correcting step (c) comprises:
    (c1) performing a C1 correction for the sector data, wherein a C1 correction time is fixed; and
    (c2) performing a C2 correction for the C1 corrected sector data, wherein a C2 correction time is fixed.

10. The method of claim 7, wherein the calculating step (f) comprises:
    (f1) calculating a time offset, wherein the time offset equals a time difference between an arrival of the sector sub-code at a node and an arrival of the corrected sector data at the node.

11. A method for audio data retrieval from an optical media, comprising the steps of:
    (a) reading a sector of audio data from the optical media, the sector comprising a sector data and a sector sub-code;
    (b) collecting the sector sub-code;
    (c) performing a C1 correction for the sector data, wherein a C1 correction time is fixed;
    (d) performing a C2 correction for the C1 corrected sector data, wherein a C2 correction time required is fixed;
    (e) storing the corrected sector data in a buffer;
    (f) suspending a reading of audio data if the buffer is full;
    (g) calculating a time offset between a time for the collecting of the sector sub-code and the C1 and C2 correction times;
    (h) matching the corrected sector data to the sector sub-code based on the calculated time offset;
    (i) determining an identity of the audio data sector based on the matched sector subcode;
    (j) locating the identified sector on the optical media; and
    (k) resuming the reading of audio data from the located sector.

12. A system for data retrieval from an optical media, comprising:
    a mechanism for reading a sector of audio data sector from the optical media, the sector comprising a sector data and a sector sub-code;
    an error correction code coupled to the reading mechanism for correcting errors in the sector data, wherein a correction time is a fixed time period;
    a buffer coupled to the error correction code for storing the corrected sector data; and
    a sub-code block coupled to the reading mechanism for collecting the sector sub-code, wherein a time offset between a time for collecting the sector sub-code and the fixed time period is calculated, and wherein the corrected sector data is matched to the sector sub-code based on the calculated time offset.

13. A controller, comprising:
    a mechanism for reading a sector of data from the optical media, the sector comprising a sector data and a sector sub-code;
    a decoding engine, comprising:
        an error correction code coupled to the reading mechanism for correcting errors in the sector data, wherein a correction time is a fixed time period; and
        a sub-code block coupled to the reading mechanism for collecting the sector sub-code; and a buffer coupled to the decoding engine for storing the corrected sector data, wherein a time offset between a time for collecting the sector sub-code and the fixed time period is calculated, and wherein the corrected sector data is matched to the sector sub-code based on the calculated time offset.

14. A system, comprising:

an optical media, containing a sector of audio data, the sector comprising a sector data and a sector sub-code;

a controller for an optical drive, comprising:
   a mechanism for reading the sector from the optical media;

a decoding engine, comprising:
   an error correction code coupled to the reading mechanism for correcting errors in the sector data, wherein a correction time is a fixed time period; and
   a sub-code block coupled to the reading mechanism for collecting the sector sub-code; and a buffer coupled to the decoding engine for storing the corrected sector data, wherein a time offset between a time for collecting the sector sub-code and the fixed time period is calculated, and wherein the corrected sector data is matched to the sector sub-code based on the calculated time offset.

15. A system for audio data retrieval from an optical media, comprising:

means for reading a sector of an audio data from the optical media, the sector comprising a sector data and a sector sub-code;

means for collecting the sector sub-code;

means for correcting any errors in the sector data in a fixed time period;

means for calculating a time offset between a time for the collecting of the sector sub-code and the fixed time period; and means for matching the corrected sector data to the sector sub-code based on the calculated time offset.

\* \* \* \* \*